United States Patent [19]
Gochenour

[11] Patent Number: 6,095,081
[45] Date of Patent: Aug. 1, 2000

[54] UNDERGROUND UTILITY LOCATION MARKER

[76] Inventor: Larry D. Gochenour, 416 N. 5th Ave., Logan, Iowa 51546

[21] Appl. No.: 08/994,735

[22] Filed: Dec. 19, 1997

[51] Int. Cl.[7] .................................................. G01D 21/00
[52] U.S. Cl. .............................. 116/209; 116/173; 52/166
[58] Field of Search ................................. 116/209, 28 R, 116/63 P, 63 R, 173; 40/610; 52/103, 104, 155, 166; 248/530, 532, 533

[56] References Cited

U.S. PATENT DOCUMENTS

| | | | |
|---|---|---|---|
| 556,518 | 3/1896 | Phelps | 52/166 |
| 788,685 | 5/1905 | Trumbo | 52/166 |
| 2,610,502 | 9/1952 | Carlson | 40/610 |
| 2,819,547 | 1/1958 | Clements, Jr. | 116/63 R |
| 3,371,647 | 3/1968 | Shopbell | 116/209 |
| 3,709,188 | 1/1973 | Coupar | 116/209 |
| 3,927,637 | 12/1975 | Sammaritano | 116/209 |
| 4,738,060 | 4/1988 | Marthaler et al. | 52/103 |
| 4,852,512 | 8/1989 | Klatt | 116/173 |
| 4,991,536 | 2/1991 | Moshofsky | 116/209 |
| 5,056,454 | 10/1991 | Turner | 116/209 |
| 5,101,755 | 4/1992 | Barrett | 116/209 |
| 5,467,729 | 11/1995 | Yamada et al. | 116/209 |
| 5,474,017 | 12/1995 | Mohebbi et al. | 116/28 R |
| 5,501,170 | 3/1996 | Walsh | 116/209 |
| 5,568,785 | 10/1996 | Hazen | 116/209 |
| 5,687,946 | 11/1997 | Cho | 248/530 |

FOREIGN PATENT DOCUMENTS

WO 93/19447  9/1993  WIPO .................................. 116/209

*Primary Examiner*—Andrew H. Hirshfeld
*Attorney, Agent, or Firm*—Henderson & Sturm LL

[57] ABSTRACT

An underground utility location marker including an elongated casing inserted into the ground above an underground utility line, and a rod received in the casing. The rod is selectively movable between a lowered storage position and a raised warning position where it can be seen by a person preparing to excavate in the area. A directional arrow and a distance indicator are carried on a ground flange attached to the top of the casing to show the direction and distance to the next adjacent marker. Also, the rod is of a distinctive color indicating a specific utility.

10 Claims, 3 Drawing Sheets

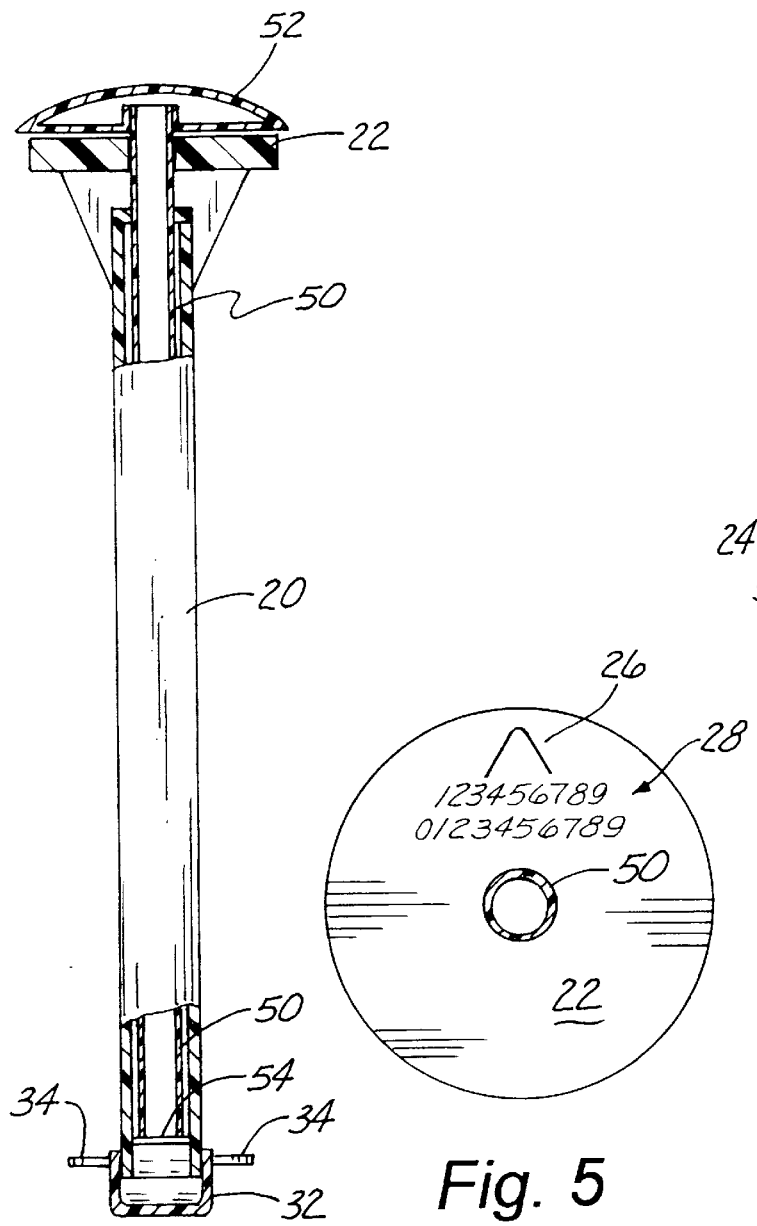
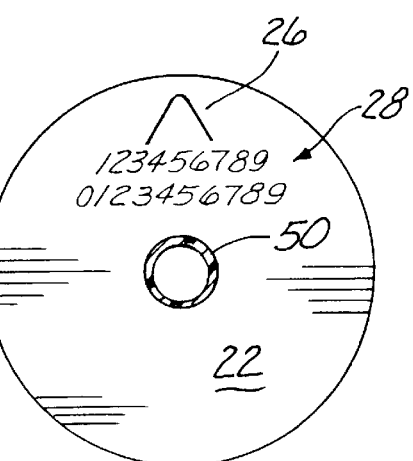
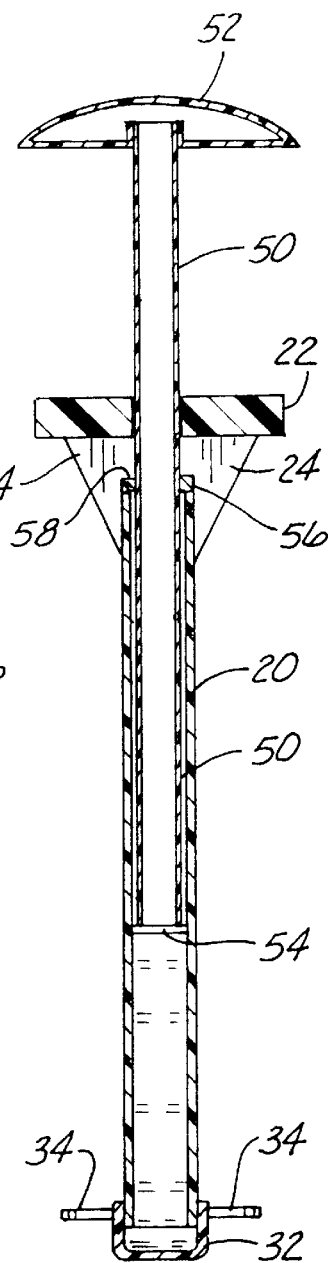
Fig. 3
Fig. 5
Fig. 4

UNDERGROUND UTILITY LOCATION MARKER

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to utility location systems, and more particularly to an underground utility line location marker that indicates the location of utility lines, the direction of the utility installation and the type of utility installation.

2. Description of the Related Art

One problem plaguing the utility industry, the construction industry and others in related areas is how to locate buried utility installations. It is often necessary to locate underground utility facilities during new construction where an excavation is required, to avoid damage to the underground utility installation by the excavation equipment. Utility companies commit substantial resources simply to the location of utility lines to perform periodic maintenance. Many utility companies are generally willing to send a crew to the site in order to locate utility facilities. The same is true with regard to commercial excavation for construction projects. These programs are instigated in order to assure that lines are not damaged, service is not interrupted, and dangerous situations are avoided. Such programs, however, are expensive. Accordingly, efficiency in the location of utility facilities underground is of great interest.

Various methods have been devised to allow an individual to locate underground utility installations. One method is simply to locate a permanent monument or stake on the surface above a particular utility installation. While stakes and surface monuments have been found somewhat useful in locating the general location of underground utility lines, they are also extremely limited in the information that they typically provide. Also, such devices are often temporary and moveable, such that in subsequent excavations in the same area it is necessary to again have the utility crew determine the exact location of the facility. Conventional stakes often do not indicate the type of utility although it is often of great importance. For example, excavation over a gas line may be conducted differently than excavation over telephone lines.

There are administrative problems associated with the location of subsurface utilities since it is often necessary to first search utility or municipal records in order to obtain the approximate location of the utilities. If is then necessary to travel to the scene, locate appropriate monuments such as property line markers, and then to measure from the monuments in order to approximate the location of the utilities. Even after going through these steps, adequate information is often not provided It is very likely that direction of the line is only approximate and it may not even be possible to fully identify the types of utility buried, in that utility lines not found in the search could also traverse the area.

Those concerned with these and other problems recognize the need for an improved underground utility location marker.

BRIEF SUMMARY OF THE INVENTION

The present invention discloses an underground utility location marker including an elongated casing inserted into the ground above an underground utility line, and a rod received in the casing. The rod is selectively movable between a lowered storage position and a raised warning position where it can be seen by a person preparing to excavate in the area. A directional arrow and a distance indicator are carried on a ground flange attached to the top of the casing to show the direction and distance to the next adjacent marker. Also, the rod is of a distinctive color indicating a specific utility.

Therefore, an object of the present invention is the provision of an improved underground utility location marker.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 3 is a partial side elevation sectional view of the marker with the rod in storage position;

FIG. 4 is a side elevation sectional view of the marker with the rod being raised to the warning position;

FIG. 5 is an enlarged top plan view of the ground flange at the top of the casing showing the directional and distance indicators.

DETAILED DESCRIPTION OF THE INVENTION

Figure 1:
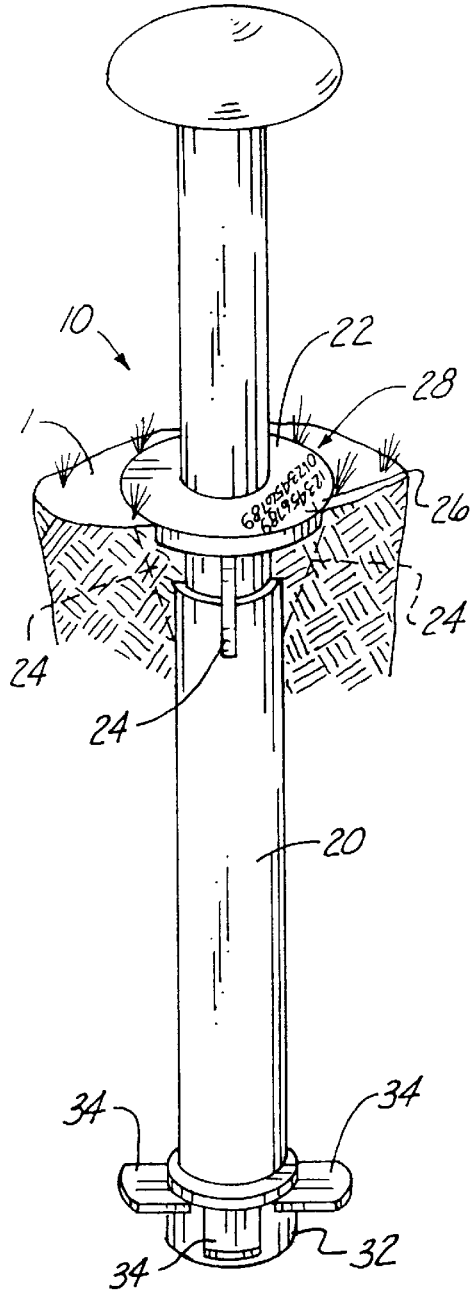
FIG. 1 is a perspective view, with the ground cut away, illustrating the location marker of the present invention with the casing inserted in the ground and the rod raised to the warning position.

Referring now to the drawings, wherein like reference numerals designate identical or corresponding parts throughout the several views, FIG. 1 shows the location marker of the present invention. The marker 10 includes a casing 20 disposed to be inserted into a ground surface 1 above an underground utility line (not shown). The top end of the casing 20 carries a ground flange 22, the under surface of which supports a number of downwardly extending fins 24. The upper surface of the ground flange 22 includes a directional arrow 26 and two rows of sequentially ordered numerals 28. The bottom end of the casing 20 supports an end cap 32 which carries a number of outwardly extending ears 34.

Figure 2:
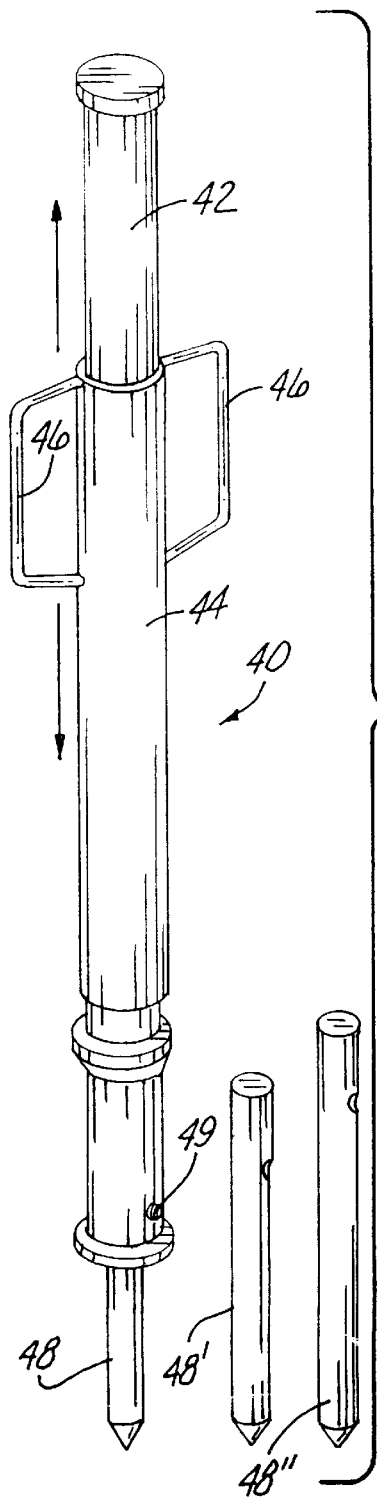
FIG. 2 is a reduced perspective view of a tool used to form pilot holes in the ground for later insertion of location markers, the additional bits being sized for different sizes of location marker.

FIG. 2 shows a pilot hole driver 40 used to form holes in the ground surface 1 into which the markers 10 are inserted. The driver 40 includes a main shaft 42 with enlarged sections near the top and bottom. A movable sleeve 44, with hand grips 46, is movable on the shaft 42 between the enlarged sections. A bit 48 is secured to the lowermost end of the shaft 42 by a set screw 49. The size of the bit 48 generally corresponds to the size of the casing 20 of the marker 10. For example, bits 48, 48' and 48" could be for 6 inch, 9 inch and 12 inch casings, respectively. It is to be understood that the size of the casing 20 can vary to be best suited for its specific application, but it is believed that the casing size will generally be in the range of 6 to 18 inches.

As best shown in FIGS. 3 and 4, a flag or rod 50 is received in the interior cavity of the casing 20. The top of the rod 50 carries a cap 52 and the bottom of the rod 50 carries an enlarged stop section 54. A waterproof O-ring seal 56 is disposed at the juncture of the casing 20 and the ground flange 22 to contact the rod 50 as it moves between its lowered storage position (FIG. 3) and its raised warning position (FIG. 4). A restricted section 58 near the top of the casing 20 is disposed to contact the stop section 54 when the rod 50 is moved to the fully raised position, thereby limiting the upward movement of the rod 50.

The marker 10 may be made of any suitable materials, however, a very durable, ultraviolet rated plastic is preferred. The cap 52 can be of any color; for example, green may be recommended for well-groomed lawns and a bright contrasting color may be recommended in areas where the markers 10 may be difficult to locate. The flag or rod 50 is of a distinctive color indicating a specific type of utility.

Figure 6:
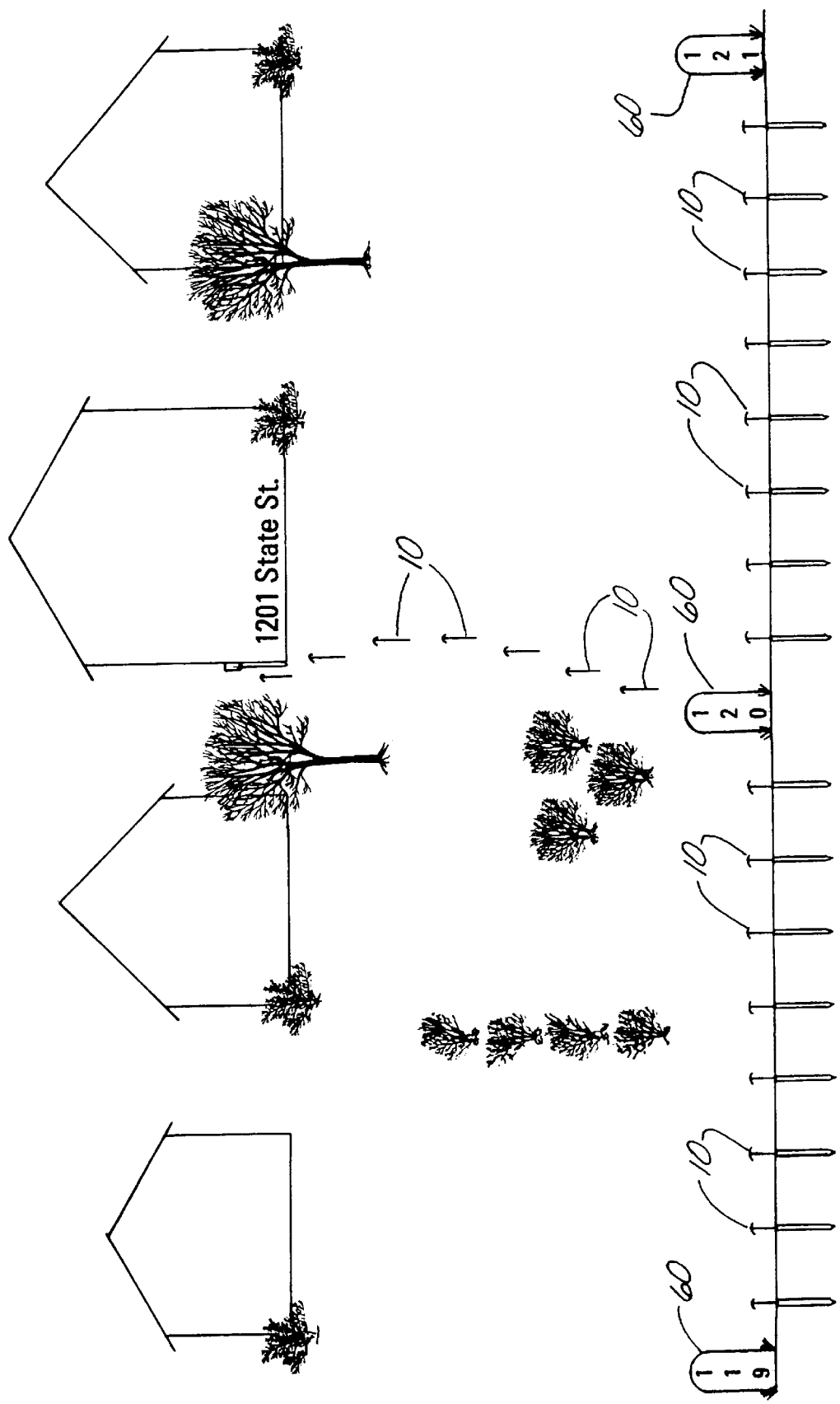
FIG. 6 is a schematic illustrating the deployment of a number of location markers to indicate the position of underground utility lines.

FIG. 6 illustrates the typical deployment of a number of location markers 10 to indicate the position of underground utility lines. The location of the utility lines is determined by conventional means and paint is used to mark the places where permanent markers 10 are desired.

The recommended starting point is from two to four feet from a pedestal 60. A weather resistant sticker can be used on the pedestal 60 with a directional arrow and a footage indicator to direct the locator to the first marker 10. The purpose of the sticker is simply economics, stickers are cheaper than flags and the pedestal 60 serves as its own visual warning to diggers.

After determining where the markers 10 are to be placed, exact measurements are taken to the nearest foot. These measurements are then recorded on the ground flange 22 by marking the appropriate numerals 28 with a punch or screwdriver. For example, marking the "1" in the first row and the "0" in the second row indicates a distance of ten feet. The marker 10 is then inserted in the ground 1 using a pilot hole driver 40 and the correct sized bit 48, 48' or 48". The molded directional arrow 26 is pointed directly towards the next adjacent marker 10, and the fins 24 engage the ground 1 to inhibit the rotation of the ground flange 22. Also, the ears 34 at the bottom end of the casing 20 inhibit the upward movement of the casing 20 once it is inserted in the ground.

The pedestal 60 must be numbered clearly and recorded accurately. For example, the recorded information for the deployment shown in FIG. 6 could be 7 flags between pedestal number 120 and 1201 State ST.; 8 flags between pedestal number 120 and 121; and 8 flags between pedestal number 120 and 119.

Once the markers 10 are in place, the digger calls the existing one call system with the location and type of work to be done. Records will indicate that permanent markers 10 are in place at this location, so the digger can be called back and instructed as to how many markers 10 he must find in each general direction. One more phone call from the digger to confirm that he has found the proper amount of markers 10 and he is clear to dig immediately. Thus, no 48-hour wait for the digger, no truck rolls, contract labor, or disposable flags or paint is required. The digger is thanked for his cooperation and asked to push the flags 50 back down when the work is done. He is also asked to notify the utility in the event of any damage to the markers 10 so that they can be replaced at a convenient time.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A location marker for underground utility lines, comprising:

an elongated casing including an interior cavity, a top end, and a bottom end, the casing being disposed to be inserted into a ground surface at a point located above an underground utility line; wherein the bottom end of the casing is provided with a plurality of fixed outwardly projecting horizontally disposed spaced ears whereby upward movement of the casing is inhibited;

a ground flange attached to the top end of the casing and being disposed to extend out from the casing, the ground flange having an under surface disposed to rest on the ground surface and an upper surface wherein the under surface of the ground flange carries a plurality of spaced downwardly disposed fins; and an elongated rod having a top end and a bottom, the rod being received in the interior cavity of the casing, the rod being movable between a lowered storage position and a raised warning position, wherein a person preparing to excavate an area near the underground utility line may visually observe the rod in the raised warning position and recognize that a utility line is located vertically below the rod.

2. The location marker of claim 1 wherein the upper surface of the ground flange carries a directional indicator, whereby a user may determine the direction to a next adjacent location marker.

3. The location of marker of claim 2 wherein the upper surface of the ground flange carries a selectable distance indicator, whereby a user may determine the distance to a next adjacent location marker.

4. The location marker of claim 1 further including a waterproof seal disposed at the top end of the casing.

5. The location of marker of claim 4 wherein the waterproof seal is an O-ring.

6. The location marker of claim 1 further including a cap attached to the top end of the rod, the cap having an under surface disposed to cover the top end of the casing when the rod is in the lowered storage position.

7. The location marker of claim 1 wherein the bottom of the rod carries an enlarged stop section disposed to engage a restricted section near the top end of the casing when the rod is in the raised warning position, whereby upward movement of the rod is limited.

8. The location marker of claim 1 wherein the rod is of a distinctive color for indicating a specific type of utility.

9. The location marker of claim 1 wherein the cap is of a color for contrasting with the ground surface.

10. The location marker of claim 1 wherein the cap is of a color for blending in with the ground surface.

* * * * *